United States Patent [19]

Hsu et al.

[11] Patent Number: 5,070,148

[45] Date of Patent: Dec. 3, 1991

[54] SEGMENTED ELASTOMER

[75] Inventors: Wen-Liang Hsu, Copley; Adel F. Halasa, Bath, both of Ohio

[73] Assignee: The Goodyear Tire & Rubber Company, Akron, Ohio

[21] Appl. No.: 466,087

[22] Filed: Jan. 16, 1990

[51] Int. Cl.$^5$ .................... C08F 255/06; C08F 279/00
[52] U.S. Cl. ................................ 525/316; 525/315; 525/314
[58] Field of Search ......................................... 525/316

[56] References Cited

U.S. PATENT DOCUMENTS

| | | | |
|---|---|---|---|
| 3,937,760 | 2/1976 | Cole et al. | 525/316 |
| 4,304,886 | 12/1981 | Bean, Jr. et al. | 525/316 |
| 4,377,665 | 3/1983 | Shiraki et al. | 525/316 |
| 4,463,123 | 7/1984 | Takeuchi et al. | 525/914 |
| 4,616,065 | 10/1986 | Hargis et al. | 525/316 |
| 4,782,119 | 11/1988 | Tsutsumi et al. | 525/914 |
| 4,908,401 | 3/1990 | Ohara et al. | 524/505 |
| 4,981,911 | 1/1991 | Herrmann et al. | 525/258 |

Primary Examiner—Melvyn I. Marquis
Assistant Examiner—W. R. H. Clark
Attorney, Agent, or Firm—Alvin T. Rockhill

[57] ABSTRACT

It is important for tire treads to exhibit good wet skid resistance, low rolling resistance, good wear characteristics and good abrasion resistance. This is often accomplished by utilizing a blend of various rubbers in making tire tread compositions. However, some of the desirable characteristics of the individual rubbers in the blend are frequently lost on mixing. The segmented elastomers of this invention offer a unique combination of desirable characteristics for utilization in making tire tread compositions. This invention more specifically discloses a rubber polymer which has an excellent combination of properties for use in making tire treads which is comprised of: (a) a first segment which is comprised of repeat units which are derived from isoprene having a microstructure wherein there are from about 75% to about 98% 1,4-linkages and from about 2% to about 25% 3,4-linkages and wherein the first segment has a number average molecular weight which is within the range of about 25,000 to about 350,000; and (b) a second segment which is comprised of repeat units which are derived from 30 to 95 weight percent 1,3-butadiene and from 5 to 70 weight percent styrene, wherein the sum of (1) the product of 1.7 and the weight percent of styrene in the segment and (2) the percentage of 1,2-butadiene linkages in the second segment is within the range of about 50% to about 92%, and wherein the second segment has a number average molecular weight which is within the range of about 50,000 to about 350,000.

20 Claims, No Drawings

SEGMENTED ELASTOMER

BACKGROUND OF THE INVENTION

It is highly desirable for tires to have good wet skid resistance, low rolling resistance, and good wear characteristics. It has traditionally been very difficult to improve a tire's rolling resistance without sacrificing its wet skid resistance and traction characteristics. These properties depend to a great extent on the dynamic viscoelastic properties of the rubbers utilized in making the tire.

In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance various mixtures of styrene-butadiene rubber and polybutadiene rubber are commonly used as a rubber material for automobile tire treads. However, such blends are not totally satisfactory for all purposes.

Carbon black is generally included in rubber compositions which are employed in making tires and most other rubber articles. It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved.

SUMMARY OF THE INVENTION

The segmented elastomers of this invention have excellent properties for incorporation into the rubber compounds used in making tire treads. The segmented elastomers of this invention can be employed to improve the wet skid resistance and traction characteristics of tires without sacrificing tread wear or rolling resistance. A highly desirable combination of tire characteristics can be attained which cannot be achieved by utilizing conventional techniques. These improvements are believed to be attributable to the unique morphology associated with the segmented elastomers.

The subject invention specifically discloses a rubber polymer which has an excellent combination of properties for use in making tire treads which is comprised of: (a) a first segment which is comprised of repeat units which are derived from isoprene having a microstructure wherein there are from about 75% to about 98% 1,4-linkages and from about 2% to about 25% 3,4-linkages and wherein the first segment has a number average molecular weight which is within the range of about 25,000 to about 350,000: and (b) a second segment which is comprised of repeat units which are derived from 30 to 95 weight percent 1,3-butadiene and from 5 to 70 weight percent styrene, wherein the sum of (1) the product of 1.7 and the weight percent of styrene in the second segment and (2) the percentage of 1,2-butadiene linkages in the second segment is within the range of about 50% to about 92%, and wherein the second segment has a number average molecular weight which is within the range of about 50,000 to about 350,000.

The present invention further reveals a process for preparing a rubbery polymer which has an excellent combination of properties for use in making tire treads which comprises: (a) polymerizing isoprene monomer with a lithium catalyst at a temperature which is within the range of about 40° C. to about 100° C. to produce a living polyisoprene segment having a microstructure wherein there are from about 75% to about 98% 1,4-linkages and from about 2% to about 25% 3,4-linkages and having a number average molecular weight which is within the range of about 25,000 to about 350,000: and (b) utilizing the living polyisoprene segment to initiate the copolymerization of 1,3-butadiene and styrene wherein the copolymerization is conducted in the presence of at least one polar modifier at a temperature which is within the range of about 40° C. to about 100° C. to produce a second segment which is comprised of repeat units which are derived from 30 to 95 weight percent 1,3-butadiene and from 5 to 70 weight percent styrene, wherein the sum of (1) the product of 1.7 and the weight percent of styrene in the second segment and (2) the percentage of 1,2-butadiene linkages in the second segment is within the range of about 50% to about 92%, and wherein the second segment has a number average molecular weight which is within the range of about 50,000 to about 350,000.

DETAILED DESCRIPTION OF THE INVENTION

In the first step of the process of this invention, isoprene is polymerized to a molecular weight within the range of about 25,000 to about 350,000. The polymerization is carried out in an inert organic medium utilizing a lithium catalyst. This polymerization step is carried out without employing a polar modifier. It is important to conduct this polymerization step in the absence of significant quantities of polar modifiers to attain a microstructure wherein there are from about 75% to about 98% 1,4-linkages and from about 2% to about 25% 3,4-linkages. It is typically preferred for the polyisoprene synthesized in the first step of the process to have a microstructure wherein there are from about 80% to about 95% 1,4-linkages and from about 5% to about 20% 3,4-linkages.

The inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The lithium catalyst which can be used are typically organolithium compounds. Organo monolithium compounds, such as alkyllithium compounds and aryllithium compounds, are usually employed. Some representative examples of organo monolithium compounds that can be utilized include ethylaluminum, isopropylaluminum, n-butyllithium, secondary-butyllithium, normal-hexyllithium, tertiary-octyllithium, phenyllithium, 2-napthyllithium, 4-butylphenyllithium, 4- phenylbutyllithium, cyclohexyllithium, and the like. Normal-butyllithium and secondary-butyllithium are highly preferred lithium catalysts.

The amount of lithium catalyst utilized will vary from one organolithium compound to another and with the molecular weight that is desired for the polyisoprene being synthesized. As a general rule, from about 0.01 phm (parts per hundred parts by weight of monomer) to 1 phm of the lithium catalyst will be employed. In most cases, from 0.01 phm to 0.1 phm of the lithium catalyst will be employed with it being preferred to utilize 0.025 phm to 0.07 phm of the lithium catalyst.

Normally, from about 5 weight percent to about 35 weight percent isoprene monomer will be charged into the polymerization medium (based upon the total weight of the polymerization medium including the organic solvent and monomers). In most cases, it will be preferred for the polymerization medium to contain from about 10 weight percent to about 30 weight percent monomers. It is typically more preferred for the polymerization medium to contain from about 20 weight percent to about 25 weight percent monomers.

The isoprene will be polymerized at a temperature which is within the range of about 40° C. to about 100° C. The polymerization temperature will preferably be within the range of about 50° C. to about 75° C. to attain the desired microstructure for the polyisoprene segment being preferred. Temperatures within the range of about 60° C. to about 70° C. are most preferred. The microstructure of the polyisoprene being prepared is dependent upon the polymerization temperature. For instance, lower temperatures will cause the polyisoprene to have a greater quantity of 3,4-microstructure. It is important for the polyisoprene to contain from about 75% to 95% 1,4-structure and from about 2% to about 25% 3,4-structure. It is typically preferred for the polyisoprene segment to contain from about 80% to about 95% 1,4-microstructure and from about 5% to about 20% 3,4-microstructure. As a general rule, it is most preferred for the polyisoprene to contain from about 87% to about 93% 1,4-microstructure and from about 7% to about 13% 3,4-microstructure.

The polymerization is allowed to continue until essentially all of the isoprene monomer has been exhausted. In other words, the polymerization of isoprene is allowed to run to completion. Since a lithium catalyst is employed to polymerize the isoprene monomer, a living polyisoprene segment is produced. The living polyisoprene segment synthesized will have a number average molecular weight which is within the range of about 25,000 to about 350,000. The living polyisoprene segment will preferably have a molecular weight which is within the range of about 50,000 to about 200,000 and will more preferably have a number average molecular weight which is within the range of about 70,000 to about 150,000.

The second step in the process of this invention involves utilizing the living polyisoprene segment to initiate the copolymerization of 1,3-butadiene monomer and styrene monomer. This copolymerization is carried out in the presence of at least one polar modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. Dipiperidinoethane, dipyrrolidinoethane, tetramethylethylene diamine, diethylene glycol dimethyl ether and tetrahydrofuran are representative of highly preferred modifiers. U.S. Pat. No. 4,022,959 describes the use of ethers and tertiary amines as polar modifiers in greater detail. The utilization of 1,2,3-trialkoxybenzenes and 1,2,4-trialkoxybenzenes as modifiers is described in greater detail in U.S. Pat. No. 4,696,986. The teachings of U.S. Pat. No. 4,022,959 and U.S. Pat. No. 4,696,986 are incorporated herein by reference in their entirety. The microstructure of the butadiene repeat units is a function of the polymerization temperature and the amount of polar modifier present. For example, it is known that higher polymerization temperatures result in lower vinyl contents (lower levels of 1,2-microstructure). Accordingly, the polymerization temperature, quantity of modifier and specific modifier selected will be determined with the ultimate desired microstructure of the polymer segment being synthesized being kept in mind.

In the second step of the process of this invention the second polymeric segment is synthesized. This is typically carried out by adding the polar modifier and monomers to the medium containing the living polyisoprene segment made in the first step. This is accomplished by first adding the modifier to the medium containing the living polyisoprene segment and subsequently adding the styrene and 1,3-butadiene. Additional solvent can also be added, if necessary, to maintain the total amount of monomers and polymer within the polymerization medium within the range of about 5 to about 35 weight percent (based upon the total weight of the polymerization medium including monomers, polymer and solvent). It is desirable to add a sufficient amount of solvent so as to maintain the total amount of polymer and monomers within the range of about 10 to about 30 weight percent and preferably within the range of about 20 to about 25 weight percent, based upon the total weight of the reaction medium.

The repeat units in the second segment are, of course, derived from 1,3-butadiene and styrene. The second segment will typically be comprised of from about 5 weight percent to about 70 weight percent repeat units which are derived from styrene and from about 30 weight percent to about 95 weight percent repeat units which are derived from 1,3-butadiene. It is normally preferred for the second segment to contain from about 10 weight percent to about 45 weight percent repeat units which are derived from styrene and from about 55 weight percent to about 90 weight percent repeat units which are derived from 1,3-butadiene. It is most preferred for the second segment to contain from about 30 weight percent to about 40 weight percent repeat units which are derived from styrene and from about 60 weight percent to about 70 weight percent repeat units which are derived from 1,3-butadiene.

It is important for the second segment to be prepared in a manner whereby the sum of (1) the product of 1.7 and the weight percent of styrene in the second segment and (2) the percentage of 1,2-butadiene linkages in the second segment is within the range of about 50% to about 92%. For example, if the second segment contains 10% bound styrene, it would need to have a 1,2-microstructure (vinyl content) within the range of 45% to 83%. In the event that the second segment contains 40% bound styrene, then the percentage of 1,2-butadiene linkages in the second segment would of necessity be 55% or less. It is preferred for the sum of (1) the product of 1.7 and the weight percent of styrene in the second segment and (2) the percentage of 1,2-butadiene linkages in the second segment to be within the range of about 70% to about 90%. It is most preferred for the sum of (1) the product of 1.7 and the weight percent of styrene in the second segment and (2) the percentage of 1,2-butadiene linkages in the second segment to be within the range of about 75% to about 85%.

In the second segment, the distribution of repeat units derived from styrene and butadiene is essentially random. The term "random" as used herein means that less than 1% of the total quantity of repeat units derived from styrene are in blocks containing four or more styrene repeat units. In other words, more than 99% of the repeat units derived from styrene are in blocks containing less than three styrene repeat units. A large quantity of repeat units derived from styrene will, of course, be in blocks containing one styrene repeat unit. Such blocks containing one styrene repeat unit are bound on both sides by repeat units which are derived from 1,3-butadiene.

The copolymerization of butadiene and styrene is generally conducted at the same temperature which is used in polymerizing the isoprene. In any case, the copolymerization will be carried out at a temperature which is within the range of about 40° C. to about 100° C. The copolymerization will preferably be conducted at a temperature which is within the range of about 50° C. to about 75° C. and will most preferably be conducted at a temperature which is within the range of 60° C. to 70° C.

The second polymerization step is normally allowed to continue until the monomers are exhausted. In other words, the copolymerization is allowed to continue until the polymerization reaction is complete. A sufficient quantity of monomers will be utilized to attain a number average molecular weight for the second segment which is within the range of about 50,000 to about 350,000. It is normally preferred for the second segment to have a number average molecular weight which is within the range of 100,000 to 250,000 with number average molecular weights within the range of 220,000 to 240,000 being most preferred.

The ratio of the number average molecular weight of the first segment (polyisoprene segment) to the number average molecular weight of the second segment (styrene-butadiene segment) will typically be within the range of about 25/75 to about 75/25. This ratio plays an important role in determining the morphology of the polymer. In cases where the ratio of the number average molecular weight of the first segment to the number average molecular weight of the second segment is within the range of about 25/75 to about 60/40, a very unique lamellar morphology results. As the ratio of the number average molecular weight of the first segment to the number average molecular weight of the second segment further increases, the morphology of the polymer changes to rod type. For instance, in cases where the ratio of the number average molecular weight of the first block to the number average molecular weight of the second block is within the range of about 65/35 to about 72/27, a rod type morphology results. As the ratio is further increased, a spherical morphology ultimately results. For example, when the ratio of the number average molecular weight of the first block to the number average molecular weight of the second block is 75/25, a sphere type morphology is generally realized.

After the copolymerization has been completed, the segmented elastomer can be recovered from the organic solvent. The segmented elastomer can be recovered from the organic solvent and residue by means such as decantation, filtration, centrification and the like. It is often desirable to precipitate the segmented polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the segmented polymer from the polymer cement also "kills" the living polymer by inactivating lithium end groups. After the segmented polymer is recovered from the solution, steam stripping can be employed to reduce the level of volatile organic compounds in the segmented polymer.

There are valuable benefits associated with utilizing the segmented elastomers of this invention in making tire tread compounds. Tire tread compounds can be made using these segmented polymers without the need to blend additional rubbers therein. However, in many cases, it will be desirable to blend the segmented elastomer with one or more additional rubbers to attain the desired performance characteristics for the tire tread compound. For instance, the segmented rubber can be blended with natural rubber to make tread compounds for passenger tires which exhibit outstanding rolling resistance, traction and tread wear characteristics. Such blends will normally contain from about 5 to about 40 weight percent natural rubber and from about 60 to about 95% of the segmented elastomer. High performance tires which exhibit very exceptional traction characteristics, but somewhat comprised tread wear, can be prepared by blending the segmented elastomer with solution or emulsion styrene-butadiene rubber (SBR). In cases where tread wear is of greater importance than traction, high cis-1,4-polybutadiene can be substituted for the SBR. In any case, the segmented rubbers of this invention can be used to improve the traction, tread wear and rolling resistance of tires made therewith.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment a segmented elastomer was synthesized. In the first step of the synthesis, 3 kg of a 17.6% solution of isoprene in hexane was charged into a Pickled 5 gallon (18.9 liter) reactor. Polymerization was initiated by adding 7.15 millimoles of n-butyllithium with the reactor being maintained at a temperature of 150° F. (65.6° C.) throughout the polymerization.

In the second step of the process, 15.3 millimoles of N,N,N',N'-tetramethylethylene diamine was added as a modifier to the reactor followed by the addition of 8.25 kg of a styrene/butadiene in hexane solution. The styrene/butadiene solution had been previously scavenged with n-butyllithium and had a ratio of styrene to butadiene of 40:60. The styrene/butadiene solution contained 19.2% monomers. The polymerization was carried out at a temperature of 150° F. (65.6° C.) until all of the monomers had been consumed which took between 3 and 4 hours. The polymerization medium was then shortstopped with methanol and the polymer was stabilized with 1 phr (parts per hundred parts of rubber) of an antioxidant. The segmented polymer which was recovered was subsequently dried in a vacuum oven which was maintained at 122° F. (50° C.).

The segmented elastomer which was recovered weighed 2,050 g. The segmented rubber which was recovered was also determined to have a Mooney ML-4 viscosity of 83. Transmission electron microscopy showed that the segmented elastomer had a lamellar morphology.

The lamellar morphology observed allows for fillers, such as carbon black, to segregate and distribute throughout the segmented elastomer in a unique and beneficial manner. For example, carbon black will normally preferentially migrate to the styrene-butadiene segment of the elastomer. However, the carbon black will preferentially migrate to the polyisoprene segment when the ratio of the number average molecular weight of the polyisoprene segment to the number average molecular weight of the styrene-butadiene segment is 1:3 or less. In other words, the segmented elastomer can be designed so that carbon black has an affinity for the polyisoprene segment by decreasing the molecular weight of the polyisoprene segment and/or increasing the molecular weight of the styrene-butadiene segment.

The lamellar morphology results in the segmented elastomer having very high strength. It also exhibits much better hysteresis than blends of SBR and polyisoprene having the same monomeric ratios. For example, the segmented elastomer was found to have a 300% modulus of 10 MPa and a tensile strength of 26 MPa while the blend of SBR and polyisoprene had a 300% modulus of 8 MPa and a tensile strength of only 20 MPa. The segmented elastomer was found to have a tan delta at 60° C. of 0.130 and a tan delta at 0° C. of 0.306. The SBR/polyisoprene blend was found to have a tan delta at 60° C. of 0.145 and a tan delta at 0° C. of 0.236. Low tan delta values at 60° C. are indicative of good rolling resistance when incorporated into tire treads and high tan delta values at 0° C. are indicative of good traction characteristics. Accordingly, tire treads can be made with the segmented polymers which have both improved traction characteristics and rolling resistance. The segmented polymers of this invention also exhibit improved Strebler adhesion and tear strength.

EXAMPLE 2

In this experiment, the technique described in Example 1 was repeated except that 5.98 kg of a 19.81% solution of isoprene in hexane was used in the first step and 5.95 kg of a 19.9% solution of 40/60 styrene/butadiene in hexane was used in the second step. The resulting segmented polymer had a Mooney viscosity of 84. The segmented polymer synthesized had a lamellar morphology as determined by transmission electron microscope (TEM).

EXAMPLE 3

In this experiment, the technique described in Example 1 was repeated except that 8.2 kg of a 17.8% solution of isoprene in hexane was used in the first step and 3.42 kg of a 20.1% solution of 40/60 styrene/butadiene in hexane was used in the second step. The resulting segmented polymer had a Mooney viscosity of 77. The segmented elastomer made had a rod morphology as determined by TEM.

EXAMPLE 4

In this experiment, the technique described in Example 1 was repeated except that 7.84 kg of a 17.5% solution of isoprene in hexane was used in the first step and 2.63 kg of a 17.4% solution of 40/60 styrene/butadiene in hexane was used in the second step. The resulting segmented polymer had a Mooney of 78. The polymer produced had a spherical morphology as determined by TEM.

EXAMPLE 5

In this experiment, the technique described in Example 2 was repeated except that the composition of styrene/1,3-butadiene was changed from 40/60 to 50/50. The resulting segmented polymer had a Mooney viscosity of 89. It has a spherical morphology as determined by TEM.

EXAMPLE 6

In this experiment, the technique described in Example 2 was repeated except that the composition of styrene/1,3-butadiene was changed from 40/60 to 60/40. The resulting segmented polymer had a Mooney viscosity of 92. It also has a spherical morphology as determined by TEM.

Variations in the present invention are possible in light of the description of it provided herein. It is, therefore, to be understood that changes can be made in the particular embodiments described which will be within the full intended scope of the invention as defined by the following appended claims.

We claim:

1. A rubber polymer which has an excellent combination of properties for use in making tire treads which is comprised of: (a) a first segment which is comprised of repeat units which are derived from isoprene having a microstructure wherein there are from about 75% to about 98% 1,4-linkages and from about 2% to about 25% 3,4-linkages and wherein the first segment has a number average molecular weight which is within the range of about 25,000 to about 350,000; and (b) a second segment which is comprised of repeat units which are derived from 30 to 95 weight percent 1,3-butadiene and from 5 to 70 weight percent styrene, wherein the sum of (1) the product of 1.7 and the weight percent of styrene in the second segment and (2) the percentage of 1,2- butadiene linkages in the second segment is within the range of about 50% to about 92%, wherein the second segment has a number average molecular weight which is within the range of about 50,000 to about 350,000 and wherein the ratio of the number average molecular weight of the first segment to the number average molecular weight of the second segment is within the range of about 25:75 to about 75:25.

2. A rubbery polymer as specified in claim 1 wherein the first segment is comprised of repeat units which are derived from isoprene having a microstructure wherein there are from about 5% to 20% 3,4-linkages and from about 80% to about 95% 1,4-linkages.

3. A rubbery polymer as specified in claim 1 wherein the first segment has a number average molecular weight which is within the range of about 50,000 to about 200,000.

4. A rubbery polymer as specified in claim 1 wherein the second segment has a number average molecular weight which is within the range of about 100,000 to about 250,000.

5. A rubbery polymer as specified in claim 1 wherein the second segment is comprised of repeat units which are derived from about 10 to about 45 weight percent styrene and from about 55 to about 90 weight percent 1,3-butadiene.

6. A rubbery polymer as specified in claim 1 wherein the sum of (1) the product of 1.7 and the weight percent of styrene in the second segment and (2) the percentage of 1,2-butadiene linkages in the second segment is within the range of about 70% to about 90%.

7. A rubbery polymer as specified in claim 1 wherein the ratio of the number average molecular weight of the first segment to the number average molecular weight of the second segment is within the range of about 25:75 to about 60:40.

8. A rubbery polymer as specified in claim 1 wherein less than 1% of the total repeat units derived from styrene in the second segment are present in blocks of four or more.

9. A rubbery polymer as specified in claim 5 wherein the first segment has a microstructure wherein there are from about 80% to 95% 1,4-linkages and from about 5% to about 20% 3,4-linkages; wherein the first segment has a number average molecular weight within the range of about 50,000 to about 200,000; and wherein the second segment has a number average molecular weight which is within the range of about 100,000 to about 250,000.

10. A rubbery polymer as specified in claim 9 wherein the sum of (1) the product of 1.7 and the weight percent of styrene in the second segment and (2) the percentage of 1,2-butadiene linkages in the second segment is within the range of about 70% to about 90%.

11. A process for preparing a rubber polymer which has an excellent combination of properties for use in making tire treads which comprises: (a) polymerizing isoprene monomer with a lithium catalyst in an inert organic medium at a temperature which is within the range of about 40° C. to about 100° C. in the absence of a significant quantity of a polar modifier to produce a living polyisoprene segment having a microstructure wherein there are from about 75% to about 98% 1,4-linkages and from about 2% to about 25% 3,4-linkages and having a number average molecular weight which is within the range of about 25,000 to about 350,000; and (b) utilizing the living polyisoprene segment to initiate the copolymerization of 1,3-butadiene and styrene wherein the copolymerization is conducted in the presence of at least one polar modifier at a temperature which is within the range of about 40° C. to about 100° C. wherein the total amount of monomers and polymer within the polymerization medium is maintained within the range of about 5 weight percent to about 35 weight percent to produce a second segment which is comprised of repeat units which are derived from 50 to 95 weight percent 1,3-butadiene and from 5 to 50 weight percent styrene, wherein the sum of (1) the product of 1.7 and the weight percent of styrene in the second segment and (2) the percentage of 1,2-butadiene linkages in the second segment is within the range of about 50% to about 92%, wherein the second segment has a number average molecular weight which is within the range of about 50,000 to about 350,000, and wherein the ratio of the number average molecular weight of the polyisoprene segment to the number average molecular weight of the second segment is within the range of about 25:75 to about 75:25.

12. A process as specified in claim 11 wherein the lithium catalyst is an organomonolithium compound.

13. A process as specified in claim 11 wherein the lithium catalyst is an alkyllithium compound.

14. A process as specified in claim 11 wherein the isoprene monomer is polymerized in step (a) in the absence of polar modifiers.

15. A process as specified in claim 11 wherein said process is conducted in a polymerization medium which contains from about 10 to about 30 weight percent monomers and polymers, based upon the total weight of the polymerization medium.

16. A rubbery polymer as specified in claim 10 wherein the first segment has a number average molecular weight which is within the range of about 70,000 to about 150,000.

17. A rubbery polymer as specified in claim 16 wherein the second segment has a number average molecular weight which is within the range of about 220,000 to 240,000.

18. A rubbery polymer as specified in claim 16 wherein the sum of (1) the product of 1.7 and the weight percent of styrene in the second segment and (2) the percentage of 1,2-butadiene linkages in the second segment is within the range of about 75% to about 85%.

19. A process as specified in claim 11 wherein the polar modifier utilized in step (b) is selected from the group consisting of dipiperidinoethane, dipyrrolidinoethane, tetramethylethylene diamine, diethylene glycol dimethyl ether, and tetrahydrofuran.

20. A process as specified in claim 11 wherein step (a) and step (b) are conducted at a temperature which is within the range of about 50° C. to about 75° C.

* * * * *